(12) United States Patent
Li et al.

(10) Patent No.: US 8,371,842 B2
(45) Date of Patent: Feb. 12, 2013

(54) MOLD WITH SLIDERS

(75) Inventors: Jian-ming Li, Tu Cheng (TW);
Xiao-ping Wu, Tu Cheng (TW);
Shih-hsiung Ho, Tu Cheng (TW)

(73) Assignee: Cheng Uei Precision Industry Co., Ltd., Tu Cheng, Taipei (TW)

( * ) Notice: Subject to any disclaimer, the term of this patent is extended or adjusted under 35 U.S.C. 154(b) by 342 days.

(21) Appl. No.: 12/913,727

(22) Filed: Oct. 27, 2010

(65) Prior Publication Data
US 2012/0107440 A1 May 3, 2012

(51) Int. Cl.
*B29C 45/44* (2006.01)

(52) U.S. Cl. .................. 425/556; 425/441; 425/DIG. 5; 425/DIG. 58

(58) Field of Classification Search .................. 425/438, 425/441, 556, DIG. 5, DIG. 58; 264/334
See application file for complete search history.

(56) References Cited

U.S. PATENT DOCUMENTS

| | | | | |
|---|---|---|---|---|
| 2,994,921 A | * | 8/1961 | Hultgren | 425/308 |
| 3,049,759 A | * | 8/1962 | Eberhardt | 425/438 |
| 4,515,342 A | * | 5/1985 | Boskovic | 249/122 |
| 4,765,585 A | * | 8/1988 | Wieder | 249/64 |
| 5,378,422 A | * | 1/1995 | Musiel et al. | 264/238 |
| 5,407,344 A | * | 4/1995 | Rombalski et al. | 425/190 |
| 6,609,903 B2 | * | 8/2003 | Kurimoto | 425/556 |
| 7,175,421 B2 | * | 2/2007 | Takemoto et al. | 425/577 |
| 7,264,465 B2 | * | 9/2007 | Schwaiger et al. | 425/577 |
| 7,381,051 B2 | * | 6/2008 | Wang et al. | 425/577 |
| 8,147,238 B1 | * | 4/2012 | Zou et al. | 425/577 |
| 2004/0076703 A1 | * | 4/2004 | Saulle | 425/190 |
| 2011/0280985 A1 | * | 11/2011 | Santos et al. | 425/556 |
| 2012/0082752 A1 | * | 4/2012 | Li et al. | 425/556 |
| 2012/0107446 A1 | * | 5/2012 | Wang et al. | 425/556 |
| 2012/0177774 A1 | * | 7/2012 | Kaufman et al. | 425/556 |

FOREIGN PATENT DOCUMENTS

| | | | | |
|---|---|---|---|---|
| JP | 02008012873 A | * | 1/2008 |
| JP | 02010005804 A | * | 1/2010 |
| JP | 02011020423 A | * | 2/2011 |

* cited by examiner

*Primary Examiner* — Yogendra Gupta
*Assistant Examiner* — Emmanuel S Luk
(74) *Attorney, Agent, or Firm* — Cheng-Ju Chiang

(57) ABSTRACT

Disclosed is a mold with sliders employed for molding a plastic product having a first lateral bulge and a second lateral bulge in different directions. The mold comprises a fixed half, an angle pin, a moving half, a main slider and a tilted slider. The angle pin comprises an angle pin body with two opposite forcing surfaces. The main slider comprises a tilted slide track corresponding to the second lateral bulge. A pin slot is formed on the main slider. Two weighted surfaces are formed on the main slider at the opposite two sides of the pin slot. The angle pin body can slidably dip into the pin slot and the driving guide slot. By acting on the tilted slider and then on the main slider with the angle pin body, the mold can respectively complete the procedure of pulling out laterally bulges aslant and horizontally.

3 Claims, 3 Drawing Sheets

8,371,842 B2

MOLD WITH SLIDERS

BACKGROUND OF THE INVENTION

1. Field of the Invention

The present invention generally relates to a mold, and more particularly to a mold with sliders.

2. Description of Prior Art

Generally, a mold structure of using a slider to pull the core out is usual in injection mold. When the plastic product has one lateral bulge or several lateral bulges in the same direction, a mold structure with merely one general slider, the smooth mold release to pull the core out can be realized.

However, once the plastic product has lateral bulges in different directions, a mold structure with multiple independent sliders becoming necessary for the smooth mold to release for pulling the core out can be possibly achieved. Nevertheless, Interferences among different sliders frequently occur.

SUMMARY OF THE INVENTION

For solving the drawbacks of aforementioned prior art, an objective of the present invention is to provide a mold with sliders for molding products having lateral bulges in different directions.

For realizing the aforesaid objective, the present invention provides a mold with sliders employed for molding a plastic product. The plastic product has a first lateral bulge and a second lateral bulge in different directions. The mold comprises a fixed half, an angle pin, a moving half operated in accordance with the fixed half, a main slider and a tilted slider. The angle pin is fixed on the fixed half and comprises an angle pin body. The angle pin body has two opposite forcing surfaces. The moving half comprises a slide track extending in a direction corresponding to the first lateral bulge. The main slider is slidably installed on the slide track and comprises a tilted slide track, extending in a direction corresponding to the second lateral bulge. The main slider comprises a tilted slide track, extending in a direction corresponding to the second lateral bulge. A pin slot is formed on the main slider and two weighted surfaces are formed on the main slider at the opposite two sides of the pin slot. A size between the two weighted surfaces is larger than a corresponding size between the two forcing surfaces of the angle pin body. The tilted slider is slidably installed on the tilted slide track of the main slider and comprises a second molding unit formed thereon for forming the second lateral bulge. A driving guide slot matching with the angle pin body is formed on the tilted slider. The first molding unit of the main slider, the second molding unit of the tilted slider, the moving half and the fixed half are enclosed to form a cavity and the angle pin body can slidably dip into the pin slot and the driving guide slot.

As aforementioned, as the mold with sliders of the present invention is opened, the angle pin body first acts on the tilted slider to move the tilted slider on the main slider to complete the separation procedure of the second lateral bulge and then, the angle pin body acts on main slider to move the main slider to complete the separation procedure of the first lateral bulge because the size between the two weighted surfaces is larger than the corresponding size between the two forcing surfaces of the angle pin body. Consequently, the mold of the present invention can be employed for molding products having lateral bulges in different directions.

DETAILED DESCRIPTION OF THE INVENTION

Figure 1:
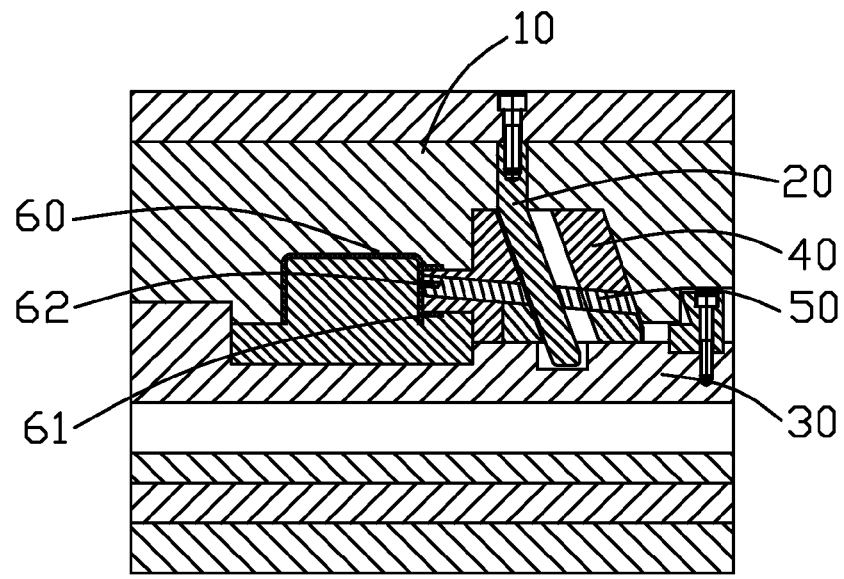
FIG. 1 shows a front sectional view diagram of a first embodiment a mold with sliders according to the present invention.

Please refer to FIG. 1. The mold 100 with sliders is employed for molding a plastic product 60. The plastic product 60 has a first lateral bulge 61 and a second lateral bulge 62 in different directions. The mold 100 with sliders comprises a fixed half 10, an angle pin 20 fixed on the fixed half 10, a moving half 30 operated in accordance with the fixed half 10, a main slider 40 and a tilted slider 50.

Figure 2:
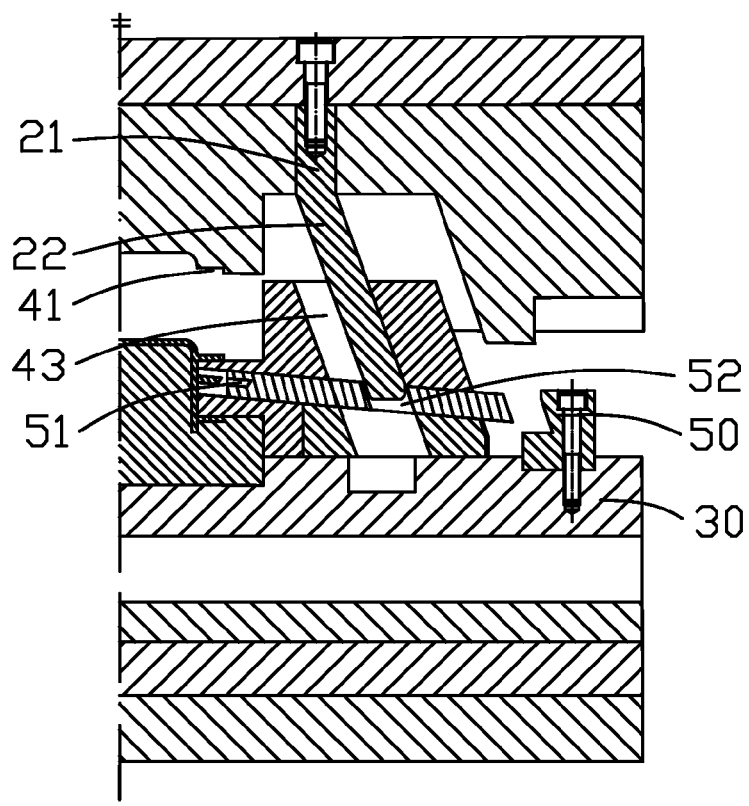
FIG. 2 shows a partial front sectional view diagram of the mold with sliders as opening shown in FIG. 1.
Figure 3:
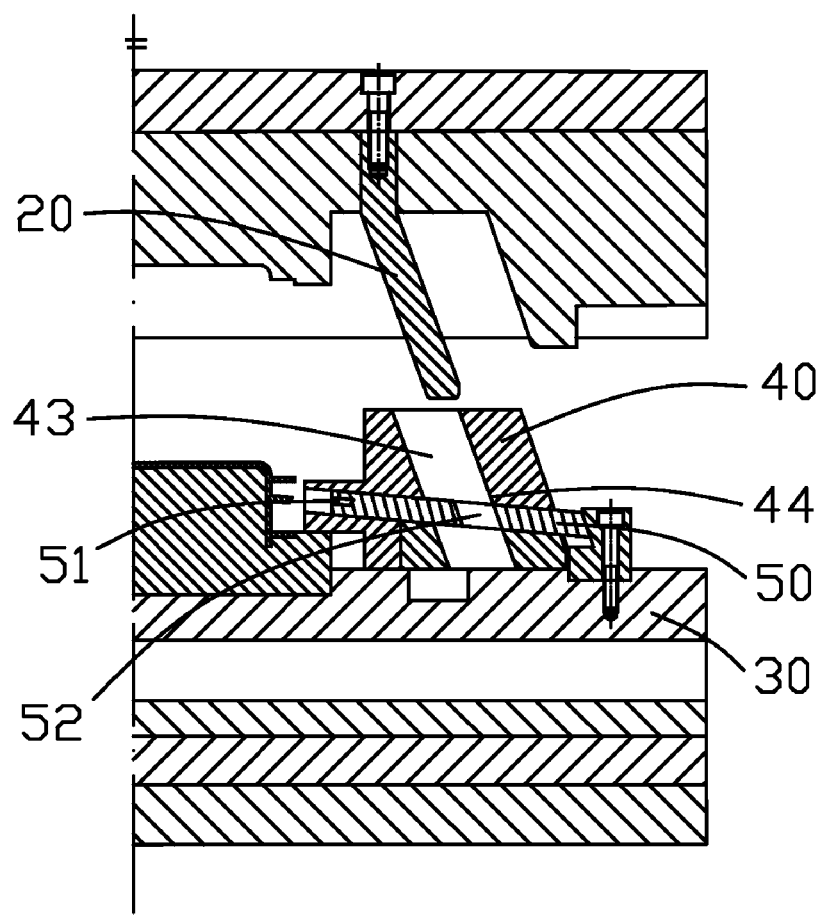
FIG. 3 shows a partial front sectional view diagram of the mold with sliders shown in FIG. 1 after the mold is opened.
Figure 4:
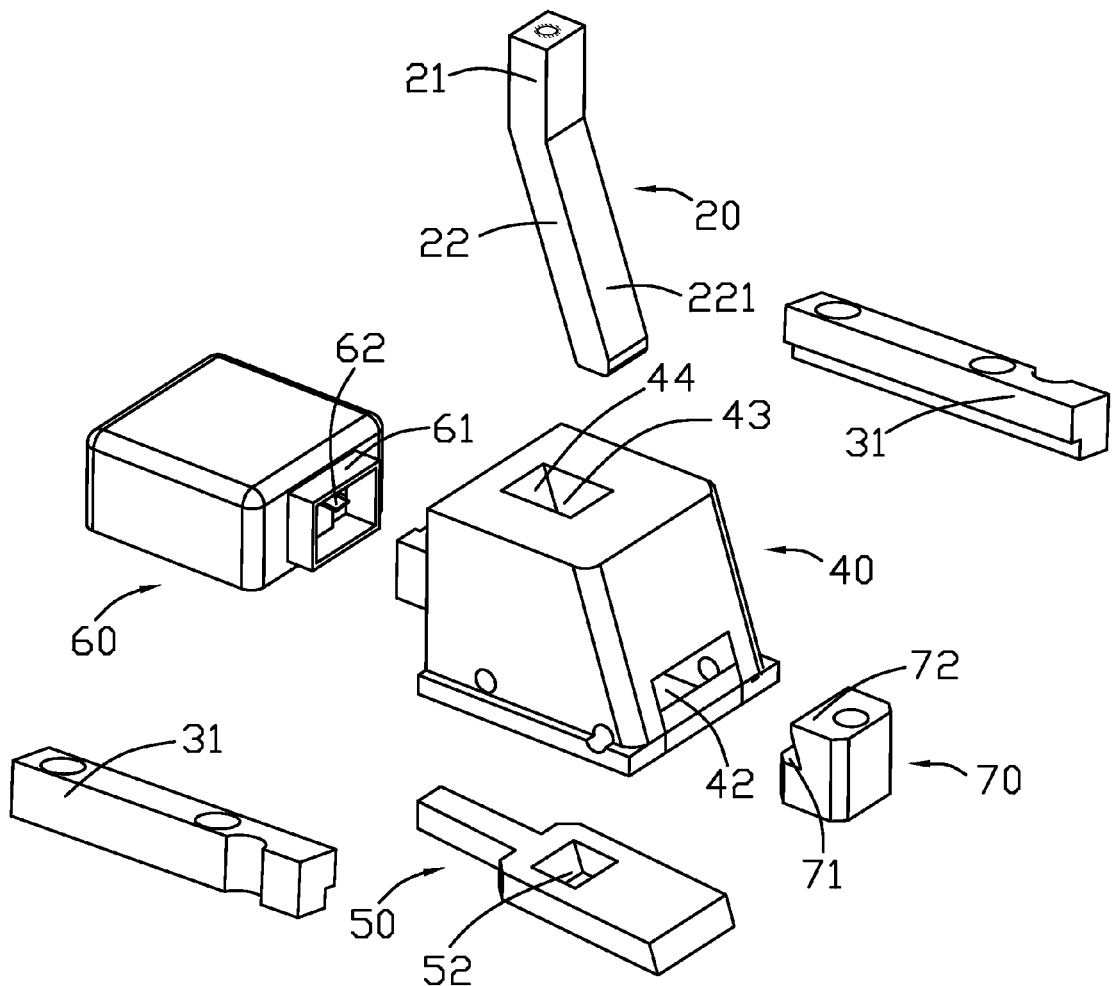
FIG. 4 shows an exploded assembly diagram of the angle pin, the main slider and the tilted slider of the mold with sliders shown in FIG. 1.

Please refer to FIG. 2, FIG. 3 and FIG. 4. The angle pin comprises a straight part 21 and an angle pin body 22 extending aslant and downwards from the bottom of the angle pin 21. The angle pin body 22 has two opposite forcing surfaces 221.

The moving half 30 comprises a slide track 31 extending in a direction corresponding to the first lateral bulge 61.

The main slider 40 is slidably installed on the slide track 31 of the moving half 30. The main slider 40, the fixed half 10 and the moving half 30 are enclosed to form a first molding unit 41 in accordance with the first lateral bulge 61. The main slider 40 comprises a tilted slide track 42, extending in a direction corresponding to the second lateral bulge 62. A pin slot 43 is formed from the top of the main slider 40 aslant and downwards and formed through the main slider 40. The angle pin body 22 can slidably dip into the pin slot 43. Meanwhile, two weighted surfaces 44 are formed on the main slider 40 at the opposite two sides of the pin slot 43. A size between the two weighted surfaces 44 is larger than a corresponding size between the two forcing surfaces 221 of the angle pin body 22.

The tilted slider 50 is slidably installed on the tilted slide track 42 of the main slider 40. The tilted slider 50 and the moving half 30 are enclosed to form a second molding unit 51 in accordance with the second lateral bulge 62. A driving guide slot 52, which matches with the angle pin body 22 and is in accordance with the pin slot 43 is formed on the tilted slider 50. The angle pin body 22 can dip into the driving guide slot 52.

The first molding unit 41 of the main slider 40, the second molding unit 51 of the tilted slider 50, the moving half 30 and the fixed half 10 are enclosed to form a cavity (not shown). The first lateral bulge 61 is docked with the main slider 40 and the second lateral bulge 62 is docked with the tilted slider 50.

A limitation block 70 is fixedly installed on the moving half 30. The limitation block 70 comprises a first stopper 71 capable of stopping the main slider 40 and a second stopper 72 capable of stopping the tilted slider 50.

As the mold 100 with sliders of the present invention is opened, the angle pin body 22 of the angle pin 20 acts on the tilted slider 42 to move the tilted slider 42 outwards. Accordingly, the second lateral bulge 62 of the plastic product 60 separates from the tilted slider 50 until the angle pin 20 is pulled out from the driving guide slot 52 to complete the procedure of pulling laterally bulges aslant (as shown in FIG. 2). In the aforesaid procedure, the main slider 40 is not moved because the size between the two weighted surfaces 44 of the pin slot 43 is larger than a corresponding size between the two forcing surfaces 221 of the angle pin body 22. After the angle pin 20 is pulled out from the driving guide slot 52, the angle pin 20 starts to act on the main slider 40 to move the main slider 40 outwards. Meanwhile, the main slider 40 drags the tilted slider 50 outwards together. Accordingly, the first lateral bulge 61 of the plastic product 60 separates from the main slider 40 until the angle pin 20 is pulled out from the pin slot 43 to complete the procedure of pulling laterally bulges horizontally (as shown in FIG. 3). Now, the main slider 40 and the tilted slider 50 reach against the limitation block 70. When the mold 100 is closed, the main slider 40 and the tilted slider 50 are acted by the angle pin 20 and back to positions.

As aforementioned, in the mold 100 with sliders of the present invention, the angle pin body 22 first acts on the tilted slider 50 to move the tilted slider 50 on the main slider 40 to complete the separation procedure of the second lateral bulge 62 and then, the angle pin body 22 acts on main slider 40 to move the main slider 40 to complete the separation procedure of the first lateral bulge 61 because the size between the two weighted surfaces 44 of the pin slot 43 is larger than the corresponding size between the two forcing surfaces 221 of the angle pin body 22. Consequently, the mold 100 of the present invention can be employed for molding products having lateral bulges in different directions.

As is understood by a person skilled in the art, the foregoing preferred embodiments of the present invention are illustrative rather than limiting of the present invention. It is intended that they cover various modifications and similar arrangements be included within the spirit and scope of the appended claims, the scope of which should be accorded the broadest interpretation so as to encompass all such modifications and similar structure.

What is claimed is:

1. A mold with sliders, employed for molding a plastic product, having a first lateral bulge and a second lateral bulge in different directions, comprising:

a fixed half;
an angle pin, fixed on the fixed half and comprising an angle pin body with two opposite forcing surfaces;
a moving half, operated in accordance with the fixed half and comprising a slide track extending in a direction corresponding to the first lateral bulge;
a main slider, slidably installed on the slide track and comprising a first molding unit formed thereon for forming the first lateral bulge, and comprising a tilted slide track, extending in a direction corresponding to the second lateral bulge, and a pin slot is formed on the main slider and two weighted surfaces are formed on the main slider at the opposite two sides of the pin slot, and a size between the two weighted surfaces is larger than a corresponding size between the two forcing surfaces of the angle pin body; and
a tilted slider, slidably installed on the tilted slide track of the main slider and comprising a second molding unit formed thereon for forming the second lateral bulge, and a driving guide slot matching with the angle pin body is formed on the tilted slider;
wherein the first molding unit of the main slider, the second molding unit of the tilted slider, the moving half and the fixed half are enclosed to form a cavity and the angle pin body can slidably dip into the pin slot and the driving guide slot.

2. The mold with sliders of claim 1, wherein a limitation block is fixedly installed on the moving half and comprises a first stopper capable of stopping the main slider and a second stopper capable of stopping the tilted slider.

3. The mold with sliders of claim 1, wherein the angle pin comprises a straight part and the bottom of the angle pin extends aslant and downwards to form the angle pin body.

* * * * *